Feb. 9, 1960 W. H. LEE 2,924,764
INDUCTION MOTOR SPEED CONTROL
Filed Nov. 7, 1957 2 Sheets-Sheet 1

INVENTOR.
WILLIAM H. LEE
BY Bosworth, Sessions,
Herestrom + Knowles
ATTORNEYS

Feb. 9, 1960
W. H. LEE
2,924,764
INDUCTION MOTOR SPEED CONTROL
Filed Nov. 7, 1957
2 Sheets-Sheet 2
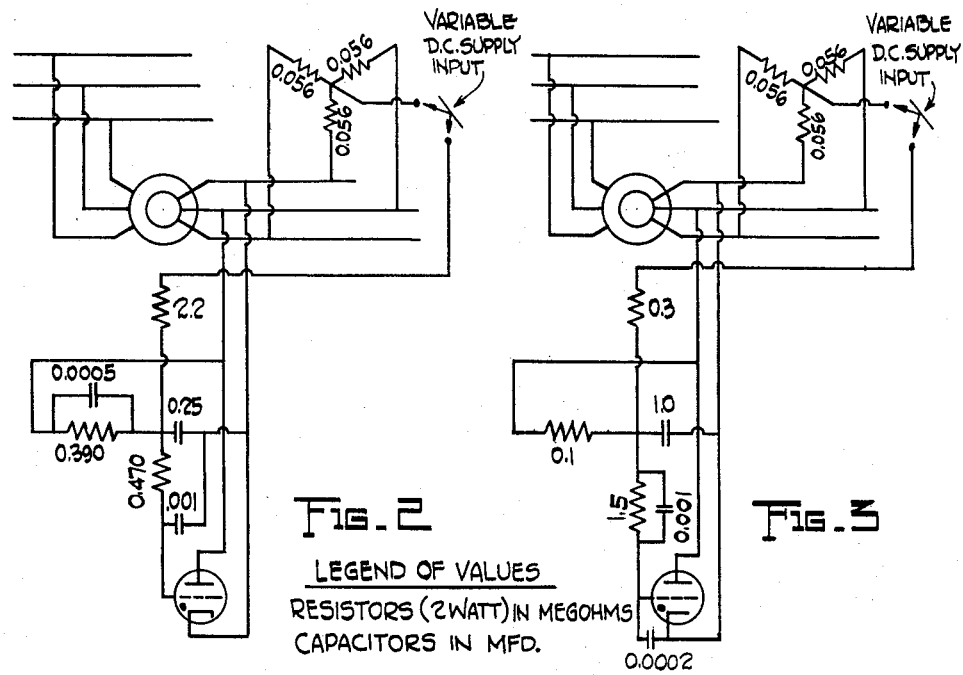
LEGEND OF VALUES
RESISTORS (2 WATT) IN MEGOHMS
CAPACITORS IN MFD.
Fig. 2
Fig. 3
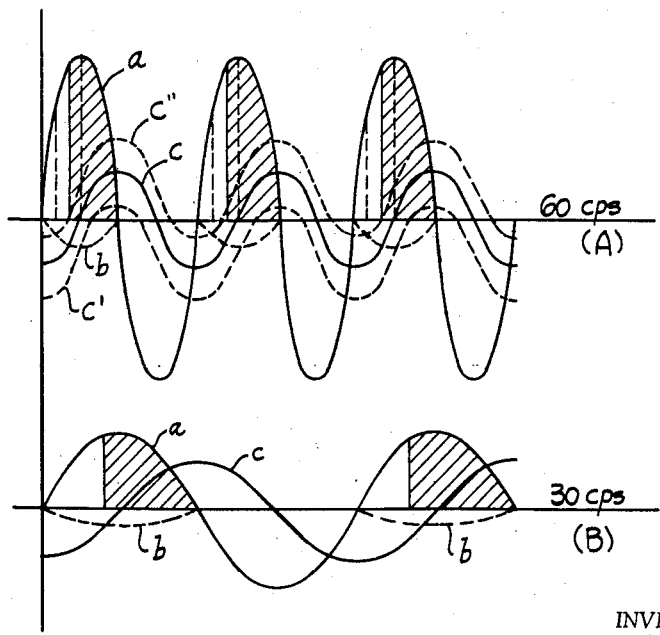
Fig. 4
INVENTOR.
WILLIAM H. LEE
BY Bosworth, Sessions,
Herrstrom & Knowles
ATTORNEYS

United States Patent Office 2,924,764
Patented Feb. 9, 1960

2,924,764

INDUCTION MOTOR SPEED CONTROL

William H. Lee, Willoughby, Ohio

Application November 7, 1957, Serial No. 695,016

8 Claims. (Cl. 318—237)

This invention relates to a speed control especially adapted for polyphase induction motors of the wound rotor type.

Wound-rotor induction motors are highly advantageous because of their simple construction, sturdiness and efficiency. The problem of controlling the speed of such motors in an efficient and simple manner, however, has been such that the application of the motors has been limited. The usual speed control for induction motors embodies circuits arranged to control the impedance of the secondaries or rotors of the motors. It has been proposed to use electronic controls embodying thyratrons or other controlled arc discharge tubes to control the secondary circuits of such motors. One such control is shown in my prior Patent No. 2,717,349. This control operates smoothly and efficiently throughout a wide range of speeds and loads, but the circuit involves, in addition to the thyratron tubes, some rather expensive and bulky components.

As is well known, in wound rotor induction motors, the frequency of the current induced in the rotor windings varies from line frequency at standstill to a value approaching zero as the motor approaches synchronous speed. It is this characteristic of induction motors that makes the problem of control of the impedance of the secondaries of the motors through thyratrons a difficult one, and it is this problem which the present invention has solved in a simple, inexpensive and effective manner.

The present invention relates to a stable and efficient control for wound rotor induction motors in which the impedance of the motor secondary is controlled by thyratrons or other controlled arc discharge tubes, and which is arranged so that the speed of the motor can be controlled by a D.C. control voltage through simple networks that require nothing more than inexpensive, light and compact resistors and capacitors.

Briefly, these results are accomplished through a control circuit in which thyratrons are employed to control the impedance of the secondary windings of the motor, and in which the control voltage applied to the grid of each thyratron embodies an A.C. component derived from the secondary winding to be controlled and supplied to the grid of the thyratrons through a resistance-capacitance network arranged so that phase relationship of the A.C. component to the plate voltage remains substantially constant and the magnitude of the A.C. component is maintained at a substantially constant value. The phase relationship and magnitude remain substantially constant regardless of the variations in frequency and value of the secondary voltage that take place with changes in the speed of the motor. In order to secure good regulation, the grid voltage preferably is about 90° out of phase with the plate voltage. When such an A.C. voltage is available, it is a relatively simple matter to control the speed of the motor by means of a D.C. bias voltage that controls the level of the grid voltage.

With such an arrangement, the time in each positive half cycle at which the thyratrons fire and, hence, the impedance of the motor secondary can be controlled by varying the D.C. bias. Thus, by varying the D.C. voltage, the motor can be controlled to operate at any percentage of its rated load from full load to zero; and by appropriate speed controls which may take any convenient form, the motor can be controlled to operate at a substantially constant speed, regardless of variations in load within the capacity of the motor, by varying the D.C. bias to compensate for changes in load.

Referring now to the drawings which illustrate a preferred form of the invention:

Figure 2 illustrates the control circuit for a single thyratron.

Figure 3 illustrates a modified form of the control circuit for a single thyratron shown in Figure 2, and Figure 4 shows the phase relationship between the grid voltage and the plate voltage of the thyratrons and the manner in which the firing of the thyratrons is controlled at two different motor speeds.

Figure 1:
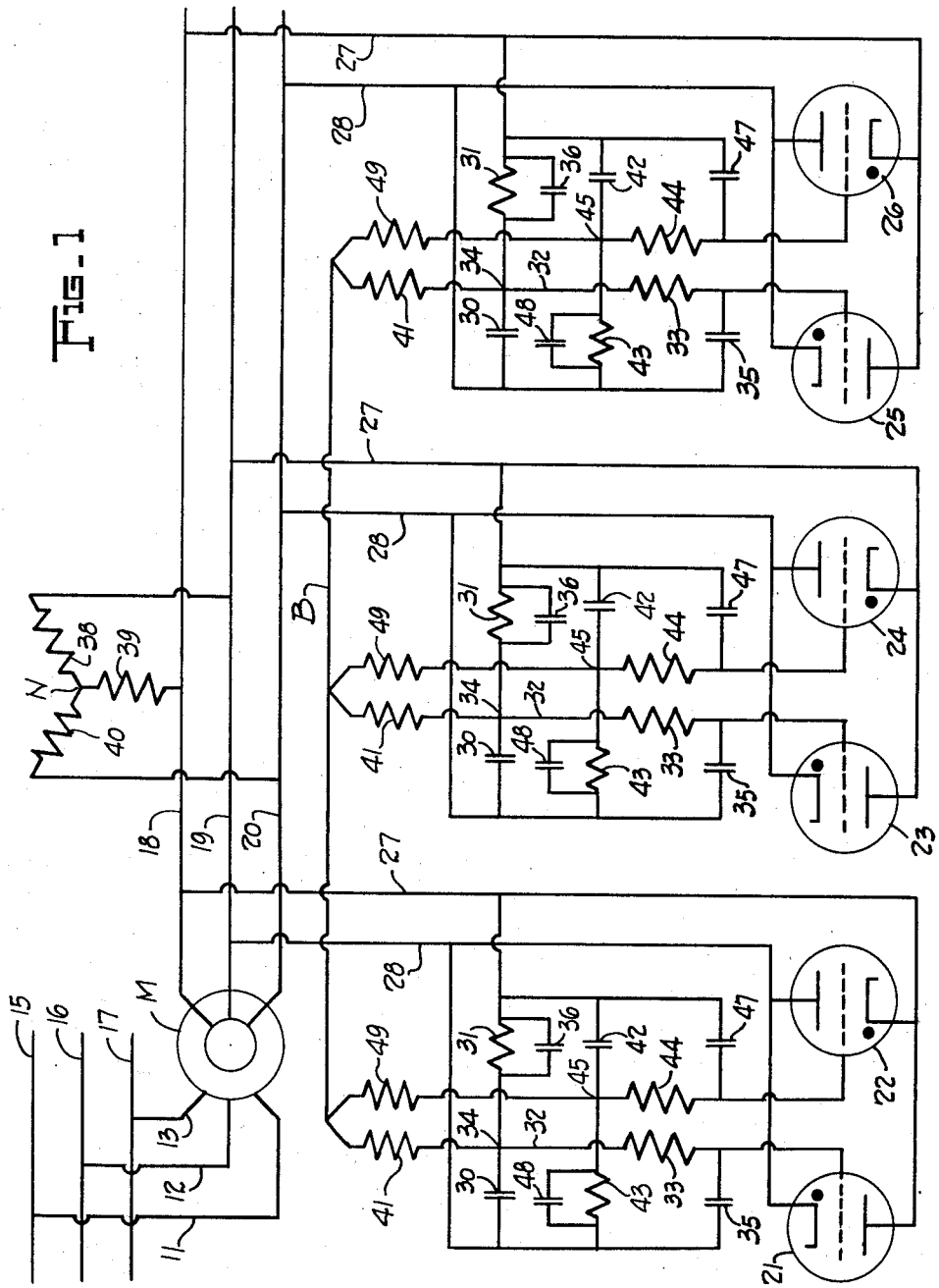
Figure 1 is a diagram showing the complete control circuit.

Referring now to Figure 1 of the drawings, a conventional three phase wound rotor induction motor is indicated at M. In this motor the stator is the primary and is supplied with three phase alternating current through conductors 11, 12 and 13 which lead to any convenient source such as the A.C. power lines 15, 16 and 17. The rotor of the motor constitutes the secondary, the rotor windings being connected through conventional slip rings and brushes to conductors 18, 19 and 20. In order to control the impedance of the secondary of the motor and thereby to control the output of the motor, thyratrons or similar controlled arc discharge devices are connected in the secondary circuit. In the embodiment shown in the drawings, two inversely connected thyratrons are associated with each phase of the rotor secondary. Thyratrons 21 and 22 are connected across lines 18 and 19; thyratrons 23 and 24 are connected across lines 19 and 20; and thyratrons 25 and 26 are connected across lines 18 and 20 of the rotor circuit. With this arrangement, control of both half cycles, i.e., full wave control, is obtained in all three phases of the motor secondary. It is to be understood, however, that in some services half-wave control may be sufficient, in which case only one thyratron would be connected across each phase of the rotor windings.

The connections and the components for the controls of the three phases are identical. Accordingly, only the control for the secondary winding connected to conductors 18 and 19 will be described in detail herein. Identical reference characters have been applied to the controls for the other two phases of the rotor circuit, and it will be understood that these controls function in the same manner as the control described below.

As shown in the drawing, the plate or anode of thyratron 21 is connected to line 18 through conductor 27 while its cathode is connected to line 19 through conductor 28. The plate of thyratron 22 is connected to line 19 through conductor 28, and its cathode is connected to line 18 through conductor 27. These thyratrons, therefore, control the impedance of one phase of the rotor winding, and in like manner the thyratrons 23 and 24, and 25 and 26 control the impedances of the other phases of the rotor winding. The grids of the thyratrons control the firing thereof and hence control the impedance of the secondary circuit. If the grid voltage exceeds the critical voltage of the tubes late in the positive half cycles of the plate voltages thereof, then the tubes fire late in the half cycles, the impedance of the tubes and of the secondary circuit of the motor is relatively great, and the motor operates at light load or at a relatively small percentage of its capacity. If the grid voltage is changed so that the critical voltage of the tubes is exceeded earlier in the positive half cycles of plate voltage, then the tubes fire earlier, the impedance of the secondary circuit is reduced, and the motor operates at a greater percentage of its capacity or at a greater speed under a given load. If the tubes are fired substantially at the beginning of each positive half cycle of the plate or anode voltage, the motor operates at substantially full load. If, on the other hand, the grid voltage is held sufficiently negative so that it never exceeds the critical voltage, then the motor will stop. Thus, as is known, the motor can be controlled throughout its range by appropriate control of the grid voltage of the thyratrons, and it is to the control of this voltage that the present invention is directed.

According to the present invention, the grid voltage contains an A.C. component that is derived from the motor secondary and is controlled automatically by a resistance-capacitance network so that it has at all times, regardless of the speed of operation of the motor, a substantially constant phase relationship to the plate voltage applied to the thyratrons and a substantially constant amplitude (assuming that the line voltage of the A.C. supply to the motor remains substantially constant). Preferably the A.C. component of the grid voltage lags the plate voltage by about 90°. The grid voltage also contains a D.C. component or bias and by varying the D.C. component while maintaining the A.C. component substantially constant in phase relationship and amplitude, the point in the positive half cycle of the plate voltage at which the grid voltage exceeds the critical voltage of the tube can be varied and, accordingly, the firing of the tubes can be controlled.

The network for providing the lagging grid voltage preferably comprises capacitor 30 and resistor 31 which are connected in series across conductor 27 and 28 and thus across the anode cathode circuit of thyratron 21. The grid potential is provided by a lead 32 extending to the grid of thyratron 21 through a resistor 33, the lead 32 being connected to point 34 between capacitor 30 and resistor 31. A capacitor 35 is connected across the grid and the cathode of thyratron 21 through conductor 28 to complete the phase shift resistance-capacitance network. The A.C. component of the grid voltage is thus the voltage appearing across condenser 35. In the preferred form of the invention shown in the drawing, a small condenser 36 is connected across the resistor 31. This condenser improves the accuracy of the maintenance of the phase relationship between grid and plate voltages throughout a wide range of frequencies but is not necessary for eminently satisfactory operation of the system.

The required D.C. bias to control the level of the grid voltage is provided by impressing a D.C. signal between the neutral point N of the Y-connected resistors 38, 39 and 40, which are connected across the conductors 18, 19 and 20, and the conductor B which is connected through resistor 41 to point 34. The D.C. supply may be provided by any convenient type of control. For example, a rheostat in series with an appropriate D.C. source may be used to provide a manual control. An automatic speed control may be provided by apparatus embodying a tachometer generator producing a voltage functional of the speed of the motor. This voltage is compared to an adjustable reference voltage, and the control or bias voltage is derived from the difference between the output of the tachometer generator and the reference voltage. The fundamental principles of such controls are well known and, per se, form no part of the present invention. For present purposes, it is sufficient to say that a D.C. control signal or bias voltage is impressed between the point N and the conductor B.

The control for the grid voltage of thyratron 22 is substantially identical to that described for thyratron 21. This network includes the capacitor 42 and resistor 43 connected across the plate-cathode circuit of the thyratron 22; the resistor 44 connected between point 45 and the grid of thyratron 22; the capacitor 47 connected between the grid and the cathode circuit of the thyratron; and the small capacitor 48 connected across resistor 43. The D.C. bias is provided from conductor B through resistor 49 which is connected to point 45.

Vector analysis shows that with this network the phase relationship between the plate voltage of the thyratron and the A.C. component of the grid voltage can be maintained substantially constant throughout the range of speeds of operation of the motor, and the magnitude of the grid voltage remains substantially constant. The values of the resistors and capacitors can be calculated readily by methods ordinarily employed in the calculation of resistance-capacitance networks. As an example, in Figure 2 of the drawing, the network associated with thyratron 21 is shown with values appropriate for the control of a three phase, 60 cycle, 230 volt, 1750 r.p.m., wound rotor motor having a rating of 10 hp. and utilizing a type C6J thyratron to control the secondary current. Components of the same values would be used in connection with the other thyratrons in the control.

In more powerful motors, relatively secondary winding currents must be controlled by thyratrons in order to control the speed of the motor according to my invention. In using thyratrons capable of carrying a plate current of 30 amperes, for example, the critical grid current flowing to the grid from the plate just before the critical voltage is reached causes an appreciable voltage drop across the grid resistor; e.g., resistor 33 associated with the grid of thyratron 21 in Figure 1. This results in the grid itself being at a higher potential than it would be if the critical grid current were smaller. This extra positive potential on the grid causes the tube to fire sooner than desired. Still earlier firing results on the next cycle because a portion of this extra positive potential is retained by the grid-cathode capacitor; e.g., capacitor 35 associated with the grid of tube 21 in Figure 1. This effect is cumulative and leads to instability of the control device.

Figure 3 shows a grid phase-shift network I prefer to use to overcome this instability encountered when heavy plate currents are being controlled. A comparison of the values of the components in Figure 2 and Figure 3 shows that the grid resistor has been enlarged to limit the critical grid current and the grid-cathode capacitor has been paralleled with the grid resistor to prevent rapid excursions of the grid voltage. Also, a very small grid-cathode capacitor may be added, such as the 0.0002 mfd. capacitor shown, to increase the phase shift. The grid voltage is still substantially 90° out of phase with the plate voltage and the operation is smooth and stable.

In Figure 4 of the drawings, diagrams showing the relationship between plate and grid voltages under standstill and half speed conditions of operation are given. In these diagrams no attempt has been made to draw the voltages to scale. Under the standstill condition, a 60 cycle voltage is induced in the rotor; this voltage is indicated by curve $a$ in the diagram A. The critical voltage of the thyratron is indicated by the broken line curve $b$, and the grid voltage is indicated by the solid line curve $c$. Curve $c$ represents the condition when the control voltage is zero. With a grid voltage as shown, the thyratron will fire at the point where the grid voltage curve intersects the curve of critical voltage. The portion of each half cycle when the thyratron is conducting is indicated by the shaded portions of the plate voltage curve $a$. Other grid voltage conditions are shown by the broken line curves $c'$ and $c''$. If the D.C. signal voltage between point N and conductor B supplies a negative bias, the grid voltage curve is lowered, as shown by curve $c'$. The grid voltage, therefore, equals the critical voltage later in the cycle, and the tube fires later in the cycle, thereby increasing the impedance of the motor secondary circuit. The other condition is shown in curve c''. Here a positive bias is furnished by the D.C. signal, the grid voltage is raised and becomes equal to the critical voltage early in each positive half cycle so that the tube is conductive throughout the major portion of the cycle, and the impedance of the secondary circuit is reduced. In diagram A, the curve c'' is raised to such a level that the motor is operated at close to its rated capacity.

Diagram B of Figure 4 shows the condition that exists when the motor is operating at half synchronous speed. Here the increased speed has resulted in the reduction of the plate voltage $a$ to half the value of the plate voltage in diagram A, and its frequency is 30 cycles instead of 60 cycles. It is to be noted, however, that the magnitude of the grid voltage indicated by curve $c$ is substantially the same as it was in diagram A under the standstill conditions; the frequency of the grid voltage has been reduced so that it is the same as the frequency of the plate voltage; and the phase relationship between the grid voltage $c$ and the plate voltage $a$ remain substantially the same as they were in diagram B; that is, the grid voltage $c$ is still substantially 90° out of phase with the plate voltage $a$.

A factor contributing to the stability of the circuit is the characteristics of thyratron tubes that the amount of negative bias required to prevent a tube from firing is reduced when the plate voltage is reduced. This will be evident from a comparison of the critical voltage curves $b$ in diagrams A and B. This characteristic gives the control of the present invention a self-regulating action. If the speed of the motor increases, the plate voltage $a$ decreases. The critical voltage $b$ also decreases; i.e., the amount of negative bias required to keep the tube from firing decreases. Therefore, the tube fires later in the positive half cycle, increasing the impedance of the motor secondary and tending to limit the increase in motor speed. Conversely, if the motor slows down, the plate voltage increases and the tubes fire a little earlier in the positive half cycles even though nothing is done to the D.C. bias voltage supplied to the control. The effect of a change in critical voltage becomes evident from a comparison of the shaded portions in diagrams A and B; these show that with the motor at standstill the tubes fire at an earlier point in each positive half cycle than they do with the motor operating at half speed even though the relationship between the curve $c$ and the plate voltage $a$ has not been changed by any change in the bias applied to the control. This effect is not suffiient to cause the motor to operate at constant speed for a given amount of D.C. bias. The speed of the motor drops with increasing load for a given setting of the control. However, this characteristic improves the stability of the control and makes for smoothness of control and operation throughout the range of speed of the motor.

From the foregoing, it will be evident that the invention provides an effective adjustable speed control for wound rotor induction motors. The phase-shift circuits for control of the thyratrons involve only simple capacitors and resistors with no moving parts, resulting in a control that is reliable and reasonable in cost. The control elements are compact and light in weight, and operation of the motor is smooth and easily controllable throughout its entire range. The system can be adapted readily to wound rotor motors of different sizes and types by those skilled in the art, and various types of automatic or manual controls can be employed to furnish the D.C. control signal that is required to vary the level of the grid voltage.

Those skilled in the art will appreciate that various changes and modifications can be made in the preferred form of the control described herein without departing from the teachings of the invention. The essential characteristics of the invention are set forth in the appended claims.

I claim:

1. Apparatus for controlling the speed of a wound rotor induction motor comprising a plurality of thyratrons in circuit with the secondary of the motor and adapted to control the impedance of the motor secondary, resistance-capacitance networks associated with each thyratron for supplying the grid voltage thereto, each such network including a resistance and a capacitor connected in series across the anode-cathode terminals of the thyratron, a lead from a point between the resistance and capacitor to the grid of the thyratron, a resistor between said point and said grid, another capacitor connected across the grid and the cathode of the thyratron and means for supplying a D.C. bias voltage to vary the level of the A.C. grid voltage.

2. Apparatus according to claim 1 wherein a third capacitor is connected across the first-mentioned resistor.

3. Apparatus for controlling the speed of a wound rotor induction motor comprising a plurality of thyratrons in circuit with the secondary of the motor and adapted to control the impedance of the motor secondary, resistance-capacitance networks associated with each thyratron for supplying the grid voltage thereto, each such network including a resistance and a capacitance connected across the anode-cathode terminals of the thyratron, a lead from a point between the resistance and capacitance to the grid of the thyratron, a resistor between said point and said grid, and another capacitor connected across the grid and the cathode of the thyratron.

4. Apparatus for controlling the speed of a wound rotor induction motor comprising a plurality of thyratrons in circuit with the secondary of the motor and adapted to control the impedance of the motor secondary, resistance-capacitance networks associated with each thyratron for supplying the grid voltage thereto, each such network including a resistor and capacitor connected in series across the anode-cathode terminals of the thyratron, a lead from a point between the resistor and capacitor to the grid of the thyratron, a resistor and a capacitor connected in parallel between said point and said grid and means for supplying a D.C. bias voltage to vary the level of the A.C. grid voltage.

5. Apparatus according to claim 4 wherein a third capacitor is connected between the grid and the cathode of the thyratron.

6. Apparatus for controlling the speed of a wound rotor induction motor comprising a plurality of thyratrons in circuit with the secondary of the motor and adapted to control the impedance of the motor secondary, resistance-capacitance networks associated with each thyratron for supplying the grid voltage thereto, each such network including a resistance and a capacitance connected across the anode-cathode terminals of the thyratron, a lead from a point between the resistance and capacitance to the grid of the thyratron, and a resistance and a capacitance connected between said point and said grid.

7. Apparatus according to claim 6 wherein a third capacitor is connected between the grid and the cathode of the thyratron.

8. Apparatus for controlling the speed of a wound rotor induction motor from standstill to substantially synchronous speed comprising a plurality of controlled arc discharge devices each having a cathode, an anode, and a control electrode, said controlled arc discharge devices being in circuit with the secondary of the motor and adapted to control the impedance of the motor secondary and a circuit for controlling the firing of the discharge devices, said circuit comprising phase-shifting means substantially independent of frequency variation associated with each of said discharge devices and connected in circuit with the motor secondary in parallel circuit relationship with the associated discharge device for providing said control electrode of the associated discharge device with an A.C. control voltage that is substantially out of phase with the anode voltage applied to the associated discharge device and for maintaining the phase relationship between the control voltage and the anode voltage substantially constant throughout the range of frequencies encountered in the motor secondary during variable speed operation of the motor, said means comprising a resistance-capacitance network including two capacitors and two resistors, said capacitors being connected in parallel between the cathode and control electrode of the associated discharge device, and means for varying the level of the zero line of the A.C. control voltages.

References Cited in the file of this patent

UNITED STATES PATENTS

| | | |
|---|---|---|
| 2,501,361 | Taylor | Mar. 21, 1950 |
| 2,717,349 | Lee | Sept. 6, 1955 |